(No Model.)
D. M. PARRY.
FEEDING APPARATUS FOR PLANTERS.
No. 325,763. Patented Sept. 8, 1885.
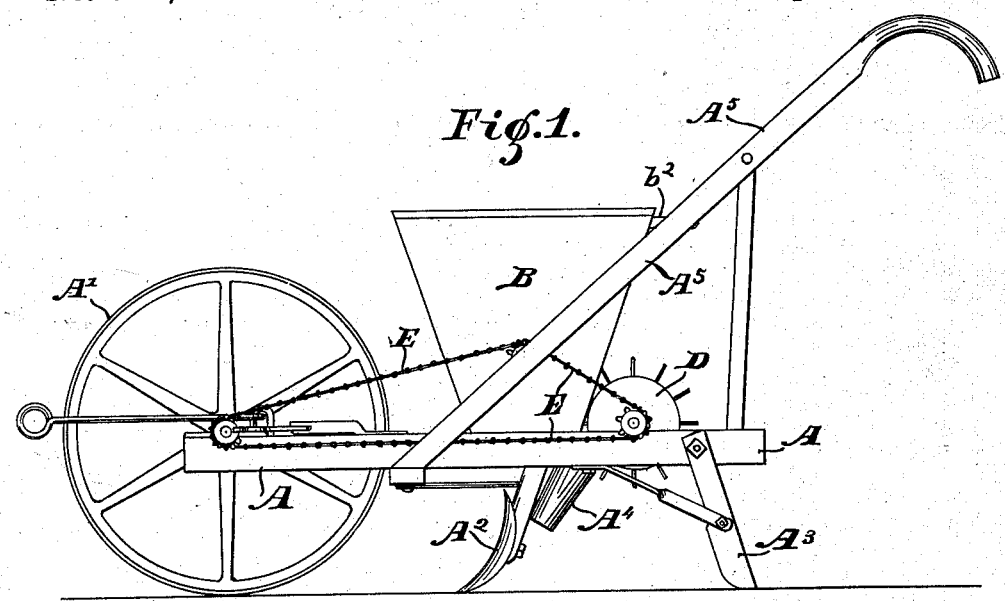
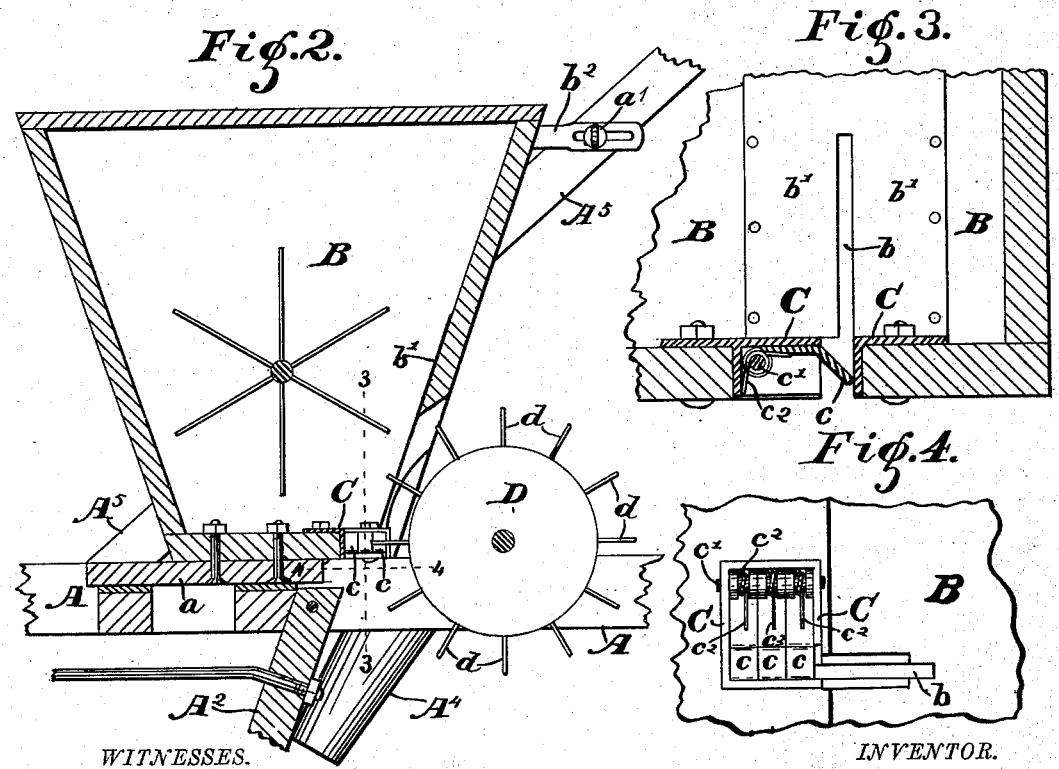
WITNESSES.
Chas N. Leonard
E. W. Bradford,
INVENTOR.
David M. Parry,
PER
C. Bradford
ATTORNEY.

United States Patent Office.

DAVID M. PARRY, OF RUSHVILLE, INDIANA.

FEEDING APPARATUS FOR PLANTERS.

SPECIFICATION forming part of Letters Patent No. 325,763, dated September 8, 1885.

Application filed June 9, 1885. (No model.)

*To all whom it may concern:*

Be it known that I, DAVID M. PARRY, of the city of Rushville, county of Rush, and State of Indiana, have invented certain new and useful Improvements in Feeding Apparatus for Planters, of which the following is a specification.

My said invention relates to the feeding mechanism of seed-planters, and is especially designed for use in that variety of planters used in planting cotton-seed, or other seed which bears or is incased in a fibrous substance; and it consists in the combination with the usual fingers, by which the seed is forced out of the hopper, of spring-fingers which serve to check or cut off the flow of seed during the time which intervenes between the passage of one finger of the force-feeding device and the next.

Referring to the accompanying drawings, which are made a part hereof, and on which similar letters of reference indicate similar parts, Figure 1 is a side elevation of a planter embodying my said invention; Fig. 2, a detail longitudinal vertical sectional view showing the feeding mechanism and adjacent parts; Fig. 3, a similar sectional view transversely thereof on the dotted line 3 3; and Fig. 4 an under side plan of a portion of the hopper, as seen from the dotted line 4 4, showing the cut-off fingers and adjacent parts.

In said drawings the portions marked A represent the frame-work of the planter; B, the hopper; C, the cut-off device; D, the feed-wheel, and E a chain-belt for driving the revolving parts.

The frame A has the usual running-wheel, A', plows or shovels $A^2$ and coverers $A^3$, seed-spout $A^4$, and handles $A^5$ and, generally, is or may be constructed in the usual and well-known manner.

The hopper B is mounted upon the frame A, preferably in such a manner (usually by means of a sliding piece, $a$, therein) as to be adapted to be moved longitudinally on said frame, and should have a slotted bar, $b^2$, which engages with a bolt having a thumb-nut, $a'$, on one of the handles or other convenient portion of the frame-work, whereby it can be secured in the position to which it has been adjusted. In its bottom, at one side, it has a suitably-formed orifice to receive the cut-off device, and in its side, next the feed-wheel, it is provided with a slot, $b$, (generally surrounded by a metal shield or plate, $b'$,) through which the fingers of said feed-wheel may extend, as shown.

The device C consists of a casing open at one side, and having spring-fingers $c$ pivoted on a transverse rod, $c'$, therein, which fingers extend across the path of the fingers $d$ of the feed-wheel or other feeding device. These fingers are so inclined that when in position they form, together with the side of the casing therefor, a small receptacle (see especially Fig. 3) into which a small quantity of the seed may enter, which is to be forced therefrom by the fingers of the feed-wheel as they come around. There are preferably several of these fingers, (three are shown,) so that the amount of seed to be fed may be regulated by moving the hopper so that more or less of these fingers will be operated upon by the fingers of the feed-wheel, this being the purpose for which the hopper is rendered adjustable upon the frame-work. The points of these fingers are arranged directly in front of the slot through the side of the hopper, so that as the fingers of the feed-wheel come through said slot they will strike these spring-fingers or the seed resting thereon and force them downwardly, thus carrying the seed out of the hopper and permitting it to drop into the seed-tube, whence it falls to the ground. The springs $c^2$ are preferably wires, coiled in their centers, with their ends extended to bear against the fingers and casing, as shown, (see Figs. 3 and 4,) but may be any springs which will answer the purpose.

The feed-wheel D is a plain wheel, having arms or spikes $d$ in its periphery, which pass through the slot in the side of the hopper and operate upon the seed therein, and the cut-off fingers, as before specified. Instead of this wheel, a traveling chain having similar spikes or fingers, or any other device having fingers which may extend in through said slot and perform this operation, may be substituted without departing from my invention, which relates especially and particularly to the spring-fingers constituting the cut-off.

The chain-belt E runs from a sprocket-wheel on the shaft of the wheel A' to a similar sprocket-wheel on the shaft of this wheel D, and also preferably to a similar wheel on the shaft of the stirrer mounted in the hopper; and thus this wheel, or the equivalent force-feeding device, and said stirrer are operated as the planter advances during the time it is in use.

I am aware that planters have been heretofore constructed with hoppers having a slot in one side and a force-feeding device adapted to operate through said slot to force the seed down through the opening in the bottom of said hopper, and I therefore limit myself to the particular construction claimed.

Having thus fully described my said invention, what I claim as new, and desire to secure by Letters Patent, is—

1. The combination, with an adjustable hopper, of a set of spring-fingers mounted in its bottom, and a force-feeding device arranged to force open and operate upon said spring-fingers, said hopper being adjustable to a position to place any number of said fingers in the path of said feeding device, substantially as set forth.

2. The combination of the hopper adjustably mounted upon the frame and provided with a slot in one side, a series of spring-fingers mounted in its bottom in front of and extending across said slot, and a force-feeding device provided with arms which project through said slot and operate upon those fingers which are placed in its path by the adjustment of the hopper, substantially as set forth.

3. The combination, in a planter, with the hopper and feeding device, of a cut-off device consisting of a casing and spring-fingers mounted therein at an angle with the sides of the casing, whereby a small receptacle is provided for a small quantity of seed, the bottom of which consists of said spring-fingers, said receptacle being arranged in front of the arms of the force-feeding device, substantially as set forth.

In witness whereof I have hereunto set my hand and seal, at Rushville, Indiana, this 5th day of June, A. D. 1885.

DAVID M. PARRY. [L. S.]

In presence of—
WM. J. HENLEY,
T. H. PARRY.